(12) United States Patent
Whalen (10) Patent No.: US 7,918,508 B2
(45) Date of Patent: Apr. 5, 2011

(54) VEHICLE SEAT HAVING AN INTEGRAL, RETRACTABLE STEP

(75) Inventor: Kelly M. Whalen, Lewis Center, OH (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 12/614,620

(22) Filed: Nov. 9, 2009

(65) Prior Publication Data

US 2010/0052396 A1 Mar. 4, 2010

Related U.S. Application Data

(62) Division of application No. 11/849,401, filed on Sep. 4, 2007, now Pat. No. 7,621,599.

(51) Int. Cl.
*B60N 2/44* (2006.01)
*A47C 7/50* (2006.01)

(52) U.S. Cl. .................................. 297/423.26

(58) Field of Classification Search ............. 297/423.26, 297/423.27, 423.28
See application file for complete search history.

(56) References Cited

U.S. PATENT DOCUMENTS

| 53,842 | A | * | 4/1866 | Lockwood et al. | 297/104 |
|---|---|---|---|---|---|
| 321,595 | A | * | 7/1885 | Gray | 297/100 |
| 794,777 | A | * | 7/1905 | Bunnell | 297/188.1 |
| 1,193,530 | A | * | 8/1916 | Fitzgerald | 297/66 |
| 1,193,868 | A | * | 8/1916 | Buckley | 297/118 |
| 1,236,517 | A | * | 8/1917 | Wemple et al. | 297/171 |
| 4,358,156 | A | * | 11/1982 | Sharff | 297/423.28 |
| 5,505,519 | A | * | 4/1996 | Natt | 297/250.1 |
| 5,836,652 | A | * | 11/1998 | Wexler et al. | 297/423.28 |
| 5,988,753 | A | * | 11/1999 | Lin | 297/423.26 |
| 6,866,341 | B2 | * | 3/2005 | Behnert | 297/423.26 |

* cited by examiner

*Primary Examiner* — Peter R. Brown
(74) *Attorney, Agent, or Firm* — Mark E. Duell; Michael A. Forhan; Eley Law Firm Co.

(57) ABSTRACT

A vehicle seat with an integral, retractable step. A generally hollow base is secured to a floor of a vehicle, the base having a pair of opposing, spaced-apart side walls. A generally horizontal seat cushion is attached atop the base. A generally vertical seatback is attached at a lower end to at least one of the floor, the base and the seat cushion. A step is coupled to the base, the step being selectively positionable between a stowed position, closing off an open base portion, and a deployed position wherein the step extends at least partially outwardly through the open base portion. In the deployed position the step is generally proximate a front surface of the seat cushion such that the front surface of the seat cushion forms a substantially closed step riser.

10 Claims, 11 Drawing Sheets

VEHICLE SEAT HAVING AN INTEGRAL, RETRACTABLE STEP

This application is a divisional of U.S. patent application Ser. No. 11/849,401, filed Sep. 4, 2007, the entire contents of which are hereby incorporated by reference thereto.

FIELD

The present invention relates generally to vehicle seats, and in particular to a vehicle seat having an integral, retractable step to aid ingress and egress therefrom.

BACKGROUND

Child safety seats typically rest upon, and are anchored to, an existing standard seat in a vehicle. Older children are often able to climb into and out of the safety seat themselves rather than being lifted into and out of the seat by an adult. This is desirable, as the task of lifting a child into and out of a safety seat can be cumbersome for many adults. However, the relatively high position of the safety seat upon the standard vehicle seat can make it difficult for many children to climb into and out of the safety seat unaided.

Child safety seats having a fixed step are disclosed in the art, such as U.S. Pat. No. 6,827,387 to Kolpasky. However, such child safety seats typically are designed to replace a standard vehicle seat. Consequently, the child safety seat must be removed and the standard vehicle seat must be re-installed if adult seating is needed, which can be both time-consuming and laborious. An alternative solution is to utilize separately attachable steps for a child safety seat. For example, U.S. Pat. No. 6,860,557 to Jonasson teaches a step apparatus that fits between a child safety seat and a standard vehicle seat. While the step of Jonasson fulfills its intended purpose, the device must be installed before the child seat is attached to the vehicle. Furthermore, both the step disclosed by Jonasson and the seat of Kolpasky include devices (i.e., a seat and a step apparatus, respectively) that must be stored either in the vehicle cargo space or elsewhere when not needed.

Seats having built-in footrests are also shown in the art, such as U.S. Pat. No. 6,866,341 to Behnert and U.S. Pat. No. 5,997,083 to Ono. However, such footrests are not intended to be used as steps. Accordingly, they are often not oriented sufficiently horizontally for use as a step. In addition, a footrest is not typically designed to bear the weight of a child for use as a stop and can collapse if used in such a manner, with the risk of injury to the child. Furthermore, footrests are typically spaced apart from the seat, leaving a gap between the footrest and the seat that a child can fall through during ingress and egress.

Lacking other solutions, parents often simply place a stepping device such as a box or crate on the floor of the vehicle, forward of the standard seat to which the child safety seat is attached. This approach also suffers from a number of drawbacks. Firstly, such a stepping device is typically not secured to the vehicle and can move or tip during use. In addition, the stepping device consumes space that could otherwise be used to carry cargo. Furthermore, depending upon the size and shape of the stepping device, there may be insufficient space on the floor of the vehicle for the child to place his or her feet when climbing on or off the stepping device. In addition, an unsecured stepping device could become a hazardous projectile if the vehicle is involved in an accident. Lastly, the stepping device must be stored either in the vehicle or elsewhere when not needed.

There is a need for a step apparatus that allows a child to safely climb into and out of a child seat that is anchored to a standard vehicle seat. There is a further need for an integral step apparatus that does not consume vehicle floor space when not in use, and does not require installation, removal or separate storage.

SUMMARY

A vehicle seat having an integral retractable step is disclosed according to the present invention. In various embodiments of the present invention the retractable step may slide, rotate or pivot from a stowed position within a floor riser of the vehicle seat. The step can be deployed to assist a child climbing into or out of a safety seat installed upon the vehicle seat, then stowed within a generally hollow base of the vehicle seat when not needed.

An object of the present invention is a vehicle seat having a generally hollow base secured to a floor of a vehicle. The base includes a pair of opposing, spaced-apart base side walls. A generally horizontal seat cushion is attached atop the base. The seat cushion is fixedly coupled to the base and has a fixed orientation with respect to the floor. An open base portion is bounded by the floor, the seat cushion and the base side walls. A generally vertical seatback is attached at a lower end to at least one of the floor, the base and the seat cushion. A step comprises a pair of opposing, spaced-apart step side walls and a generally vertical front wall extending between the step side walls. The step further includes at least two pegs, a peg being mounted to each step side wall and extending outwardly from the step side walls, into slidable engagement with a facially adjacent slot of the base side wall. Alternatively, a peg is mounted to each base side wall and extends inwardly, into slidable engagement with a slot of a facially adjacent step side wall. A generally horizontal top portion is fixedly coupled to both the front wall and the step side walls. The step is slidable upon the pegs in cooperation with the slots and is selectively positionable between a stowed position substantially within the base and a deployed position extending at least partially outwardly through the open base portion. The front wall of the step closes off the open base portion when the step is in the stowed position. In the deployed position the step is generally proximate a front surface of the seat cushion such that the front surface of the seat cushion forms a substantially closed step riser.

Another object of the present invention is a vehicle seat having a generally hollow base secured to a floor of a vehicle. The base has a pair of opposing, spaced-apart base side walls. A generally horizontal seat cushion is attached atop the base. The seat cushion is fixedly coupled to the base and has a fixed orientation with respect to the floor. An open base portion is bounded by the floor, the seat cushion and the base side walls. A generally vertical seatback is attached at a lower end to at least one of the floor, the base and the seat cushion. A step is pivotably coupled to the base side walls and is selectively positionable between a generally vertical stowed position that substantially closes off the open base portion and a generally horizontal deployed position extending at least partially outwardly through the open base portion. In the deployed position the step is generally proximate a front surface of the seat cushion such that the front surface of the seat cushion forms a step riser.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to indicate like structures in the various figures. In addition, child safety seats and associated anchors are not shown in the various figures, as the present invention is usable with a wide variety of types of such devices within the scope of the invention and thus is not limited thereby.

Figure 1:
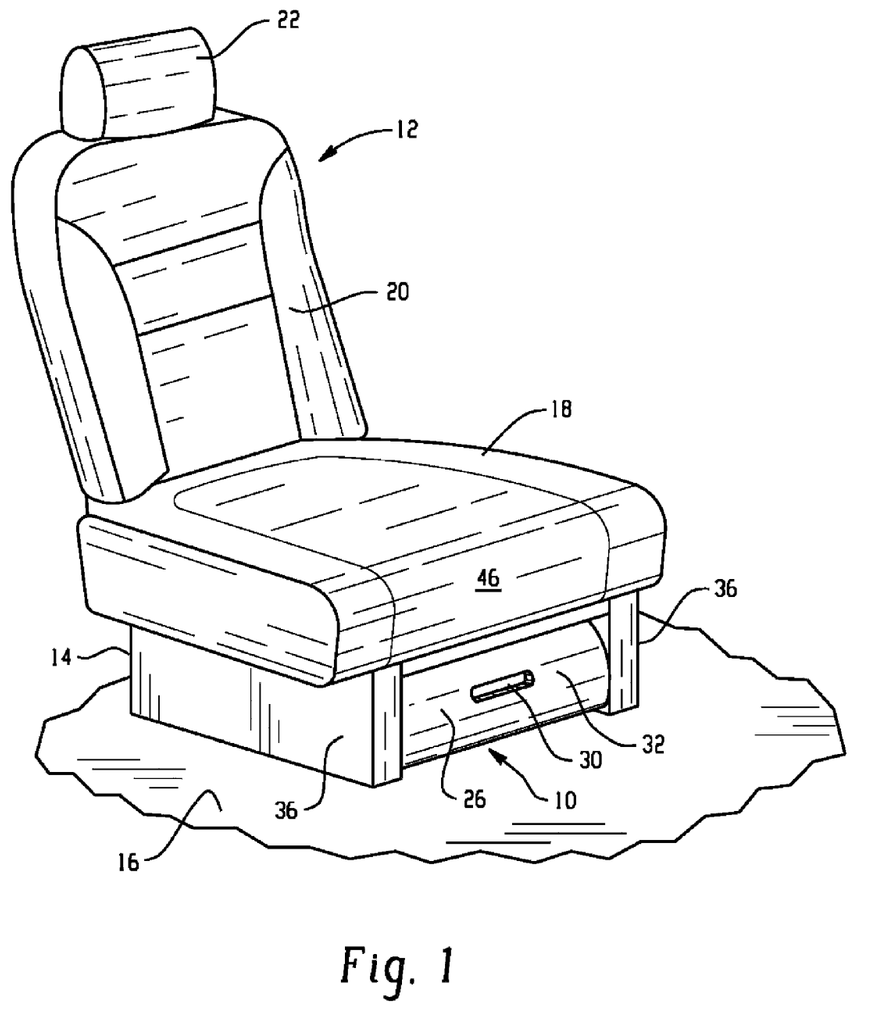
FIG. 1 is a perspective view of a vehicle seat showing the general arrangement of an integral slidable, retractable step in a stowed position according to an embodiment of the present invention.

The general arrangement of a retractable step 10 for a vehicle seat 12 is shown in a stowed condition in FIG. 1 according to an embodiment of the present invention. Seat 12 comprises a generally hollow base 14 that is detachably secured to a floor 16 of a vehicle. A seat cushion 18 is attached to base 14 and is oriented generally horizontally. A seatback 20 is oriented generally vertically and is pivotably or rigidly attached at a lower end to at least one of base 14, floor 16 and the seat cushion. A fixed, pivotable or detachable headrest 22 may be attached to an upper end of seatback 20.

Figure 2:
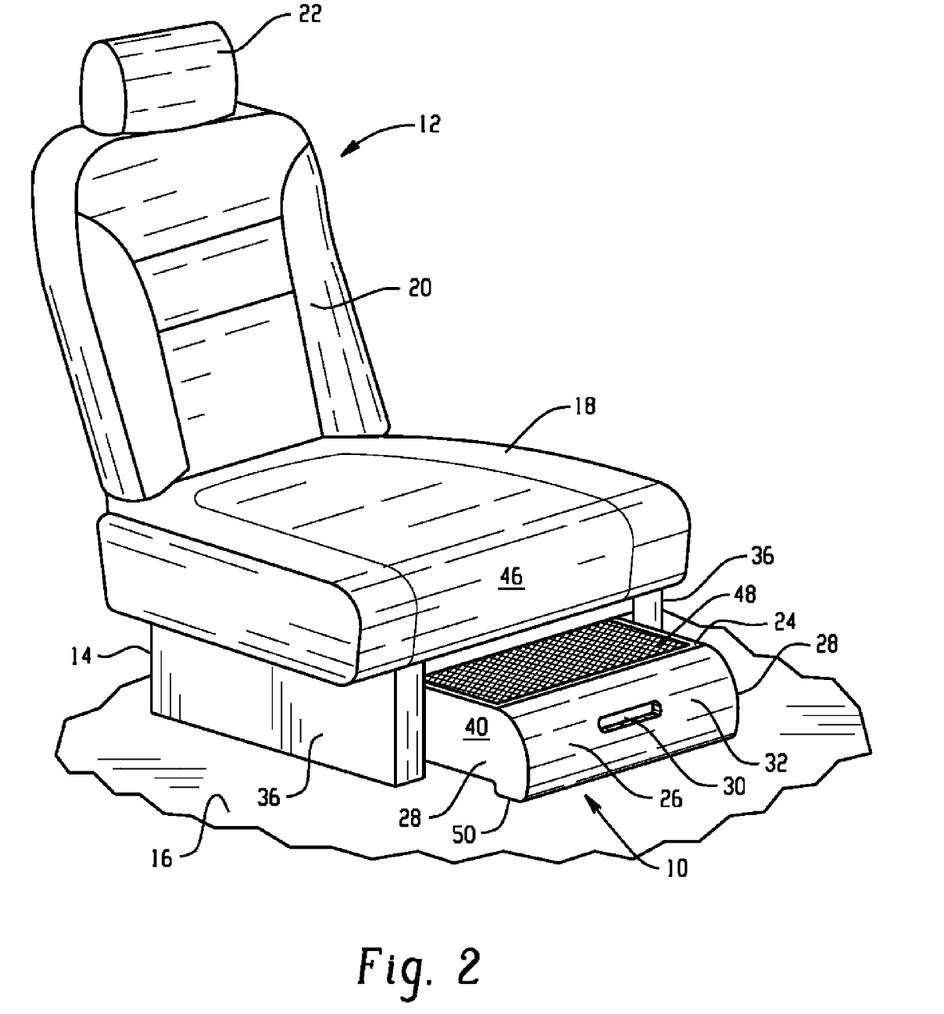
FIG. 2 is a perspective view of a vehicle seat showing the general arrangement of the slidable, retractable step of FIG. 1 in a deployed position according to an embodiment of the present invention.

FIG. 2 shows the retractable step 10 of FIG. 1 in a deployed condition. Retractable step 10 comprises a top 24, a front wall 26 and a pair of side walls 28. Step 10 may also include a rear wall and/or a bottom (not shown), if desired, to close off the step. A grip 30 such as a handle, handhold or aperture may be formed in or attached to front wall 26 to aid in deploying and stowing step 10. Front wall 26 may further include a covering 32 such as a fabric, leather or plastic material that matches or complements seat 12.

Figure 3:
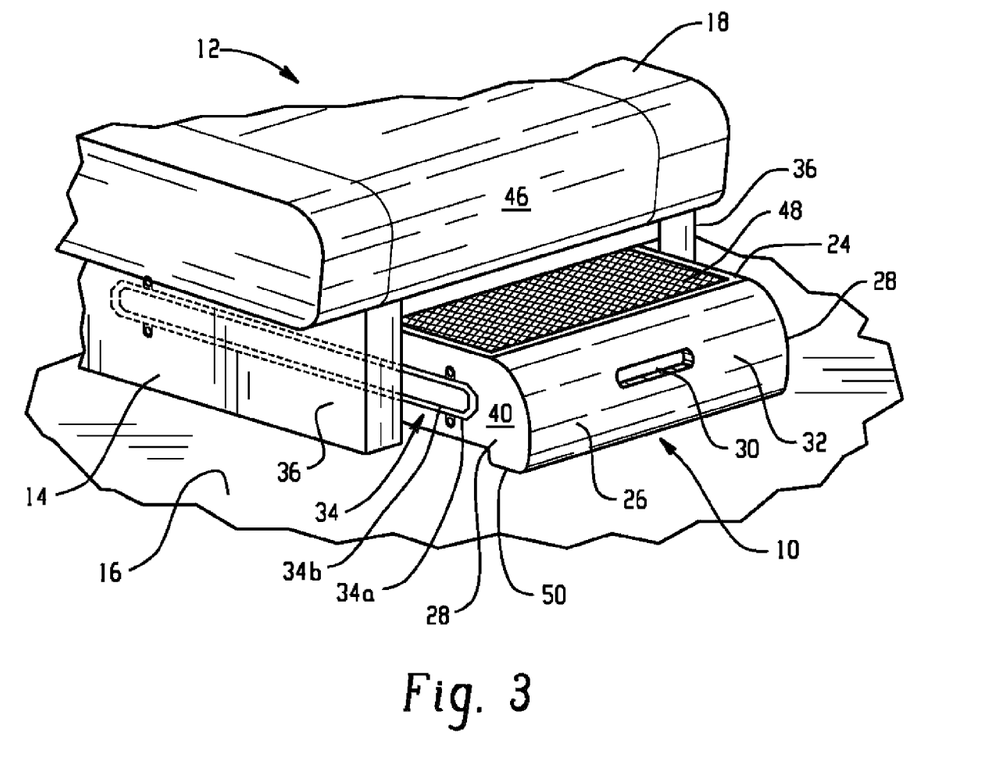
FIG. 3 is a perspective view showing details of a configuration of the slidable, retractable step of FIG. 1 according to an embodiment of the present invention.

In the embodiment of FIGS. 1 and 2 step 10 is slidable with respect to base 14. Step 10 may be slidably coupled to base 14 in any conventional manner, such as with a pair of rails 34, as shown in FIG. 3. Rails 34 each include facially adjacent first and second rail portions 34a and 34b, first rail portions 34a being attached to each side wall 28 of step 10 and corresponding facially adjacent second rail portions 34b being attached to adjacent side walls 36 of base 14. Rails 34 are preferably configured so that step 10 is able to bear the weight of an occupant of seat 12 during ingress and egress therefrom. For example, rails 34 may be made of a relatively high-strength material, such as metal. In addition, rail portions 34a, 34b may each be secured to step side walls 28 and base side walls 36, respectively, at a plurality of mounting points in order to distribute loading forces imposed upon step 10. Likewise, rail portions 34a, 34b may have sufficient engagement with each other in a deployed condition of step 10 so that the loading forces imposed upon the step are sufficiently distributed along the engaged rail portions.

Figure 4:
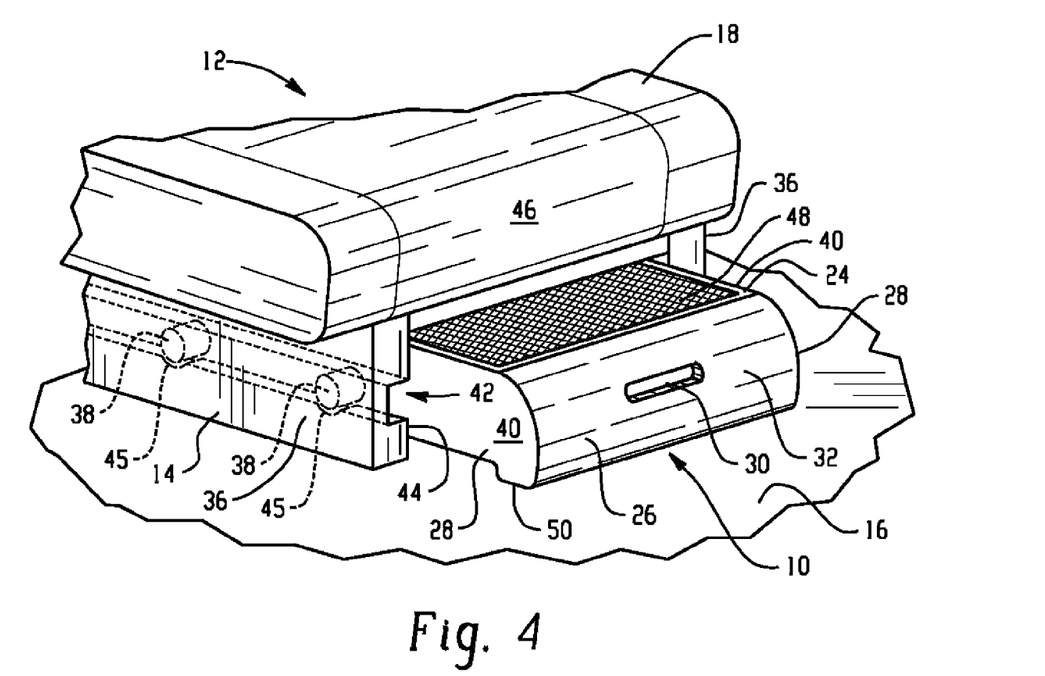
FIG. 4 is a perspective view showing details of another configuration of the slidable, retractable step of FIG. 1 according to an embodiment of the present invention.
Figure 5:
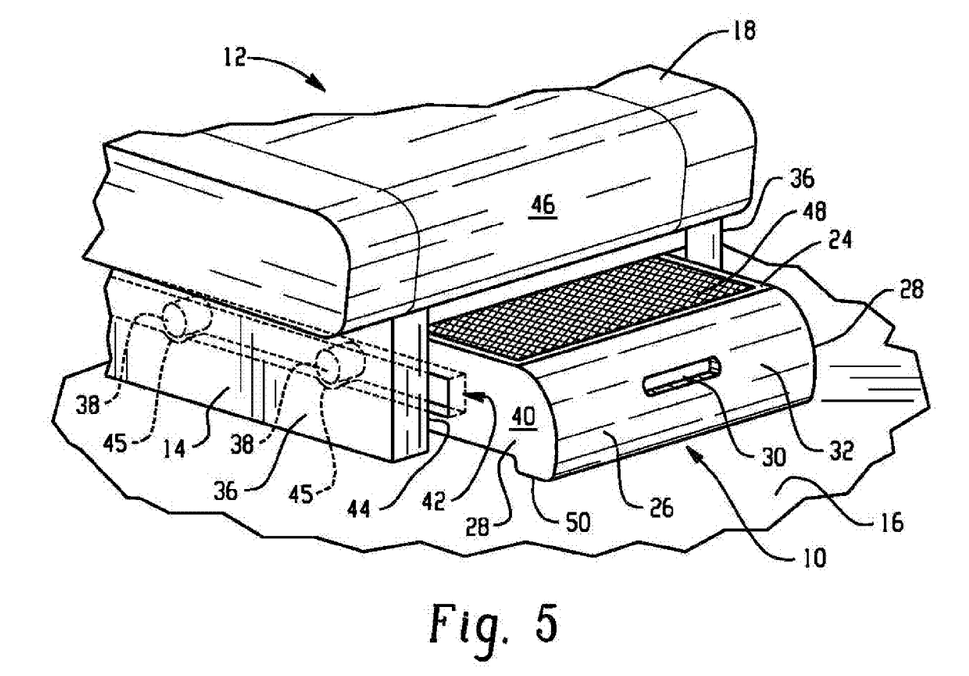
FIG. 5 is a perspective view showing details of yet another configuration of the slidable, retractable step of FIG. 1 according to an embodiment of the present invention.

With reference to FIG. 4, step 10 may comprise pegs 38, each peg extending outwardly from opposing outer surfaces 40 of step side walls 28 of the step, the pegs being configured to travel slidably along corresponding slots 42 formed in facially adjacent inner surfaces 44 of base side walls 36. Alternatively, slots 42 may be formed in the outer surfaces 40 of step side walls 28 of step 10, the pegs extending inwardly from adjacent inner surfaces 44 of base side walls 36, as shown in FIG. 5. In either slot-and-peg configuration step 10 is slidably movable between a stowed position substantially within base 14 (FIG. 1) and a deployed position wherein the step extends at least partially outwardly from the base (FIGS. 4 and 5). In some embodiments slots 42 may further include one or more notched detents 45 at the deployed and/or stowed positions. A corresponding peg 38 engages each notched detent 45, the pegs and notched detents cooperating to act as a travel limiter for step 10.

In operation, step 10 is normally stowed within base 14 when not in use, as shown in FIG. 1. In this state front wall 26 of step 10 generally closes off the front of base 14, concealing the step. When step 10 is to be deployed grip 30 is grasped and pulled, causing the step to move slidably and outwardly, away from base 14 as shown in FIGS. 3, 4 and 5, thereby exposing top 24 of the step for use. In the deployed condition step 10 is generally proximate a front surface 46 of seat cushion 18 such that the front surface of the seat cushion forms a substantially closed riser for the step, thereby avoiding a gap between the step and seat 12 that a child could fall through during ingress and egress.

Top 24 of step 10 may optionally include a non-skid tread 48 as shown in FIGS. 3, 4 and 5 to help deter the foot of a user from slipping. Tread 48 may comprise any conventional material including, without limitation, gritted surfaces, molded rubber and tread lugs.

In some embodiments step 10 may further include a lower support 50 configured to contact floor 16, as shown in FIGS. 2-5. Lower support 50 provides additional support for step 10 to support the weight of an occupant of the seat 12 during ingress and egress therefrom.

Figure 6:
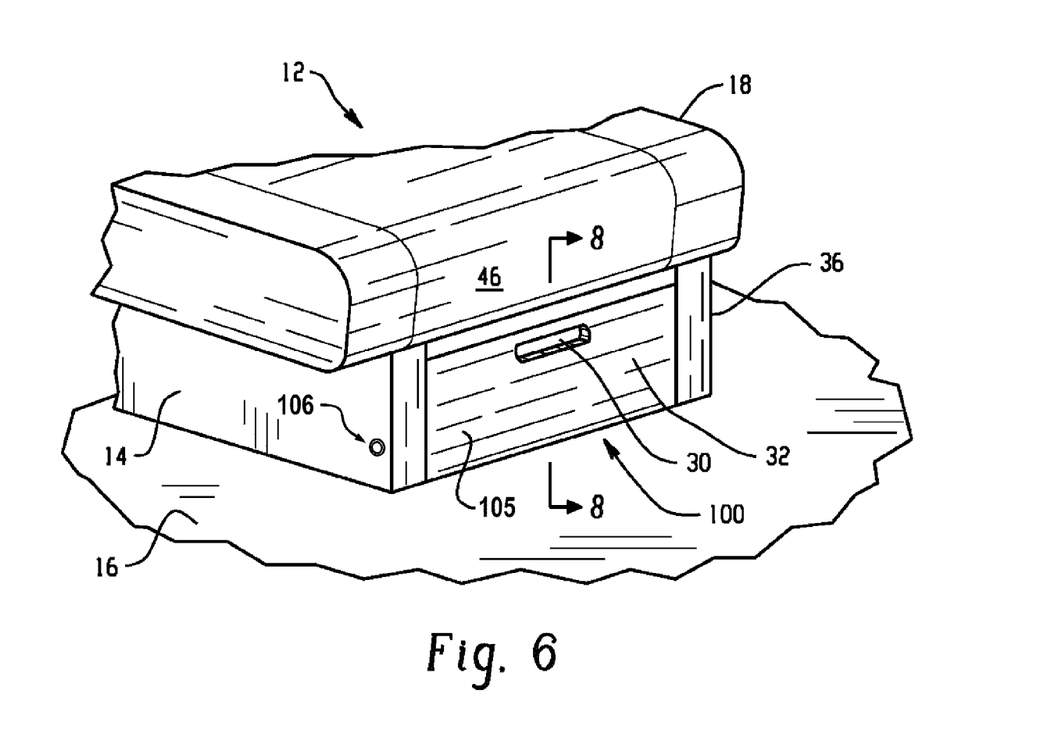
FIG. 6 is a perspective view of a vehicle seat showing the general arrangement of an integral pivotable, retractable step in a stowed position according to an alternate embodiment of the present invention.

The general arrangement of a retractable step 100 for a vehicle seat 12 is shown in FIG. 6 in a stowed condition according to another embodiment of the present invention.

Seat 12 comprises a generally hollow base 14 that is detachably secured to a floor 16 of a vehicle. A seat cushion 18 is attached to base 14 and is oriented generally horizontally. A seatback 20 (such as shown in FIG. 1) is oriented generally vertically and is pivotably or rigidly attached at a lower end to at least one of base 14, floor 16 and the seat cushion. A fixed, pivotable or detachable headrest 22 (such as shown in FIG. 1) may be attached to an upper end of seatback 20.

Figure 7:
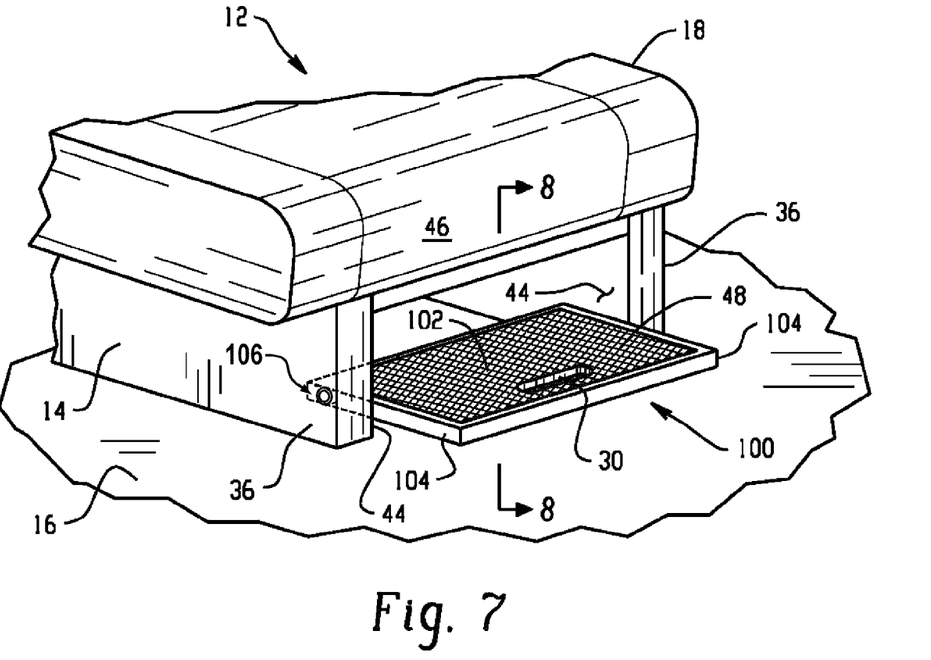
FIG. 7 is a perspective view of a vehicle seat showing the general arrangement of the pivotable, retractable step of FIG. 6 in a deployed position according to an embodiment of the present invention.

FIG. 7 shows step 100 of FIG. 6 in a deployed condition. Step 100 comprises a rear surface 102, a pair of side walls 104 and a front surface 105. A grip 30 such as a handle, handhold or aperture may be formed in or attached to step 100 to aid in deploying and stowing the step.

Figure 8:
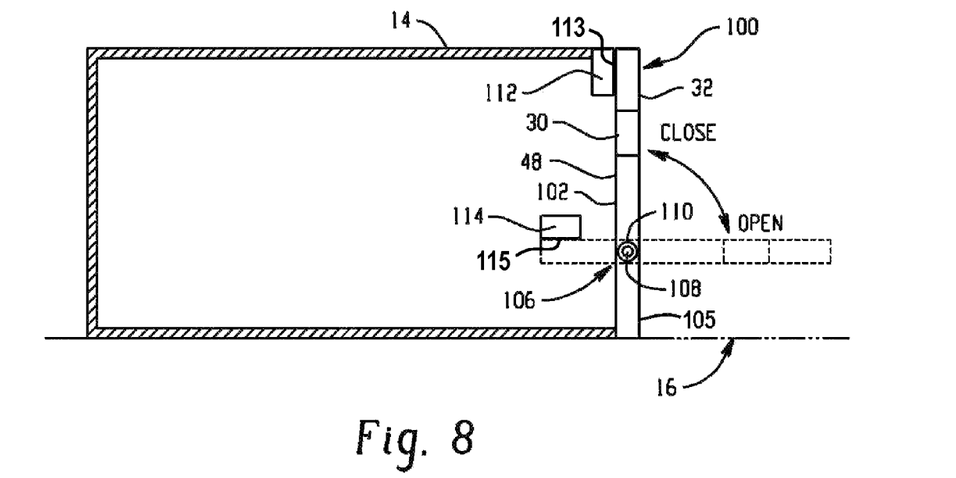
FIG. 8 is a schematic diagram showing details of the configuration of the pivotable, retractable step of FIG. 6 according to an embodiment of the present invention.

With reference to FIGS. 6, 7 and 8 together, in one configuration step 100 is attached to base side walls 36 with a pair of pivots 106. Non-limiting examples of pivots 106 include generally cylindrical pins 108 rotatably fitted into corresponding sockets 110. Pins 108 may extend inwardly and away from base side walls 36 toward facially adjacent step side walls 104, while corresponding sockets 110 are formed in the step side walls. Conversely, pins 108 may extend outwardly and away from step side walls 104 toward facially adjacent base side walls 36, while corresponding sockets 110 are formed in the base side walls. Pivots 106 may also be formed with other conventional structures, such as hinges and bearings.

Step 100 is normally stowed in a generally vertical orientation when not in use, as shown in solid lines in FIG. 8. A first releasable latch 112 such as, without limitation, a magnetic latch, hook-and-loop latch and spring-biased latch, holds step 100 in the stowed position, rear surface 102 of the step confronting a planar edge 113 of the first latch to limit upward travel of the step. In this state step 100 generally closes off the front of base 14 as shown in FIG. 6. When step 100 is to be deployed grip 30 is grasped and pulled, overcoming the holding force of first latch 112 and causing the step to pivotably move outwardly from base 14 and downwardly, thereby exposing rear surface 102 of the step for use as shown in broken lines in FIG. 8. A second releasable latch 114 such as, without limitation, a magnetic latch, hook-and-loop latch and spring-biased latch, holds step 100 in a generally horizontal deployed position, rear surface 102 of the step confronting a planar edge 115 of the second latch and limiting downward travel of the step. With reference to FIG. 7, in the deployed condition step 100 is generally proximate a front surface 46 of seat cushion 18 such that the front surface of the seat cushion forms a riser for the step, thereby avoiding a gap forward of seat 12 and between the step and seat that a child could fall through during ingress and egress.

Rear surface 102 of step 100 may optionally include a non-skid tread such as tread 48 shown in FIG. 7 to help deter the foot of a user from slipping. In addition, front surface 105 of step 100 may optionally include a covering such as covering 32 shown in FIG. 6.

Figure 9:
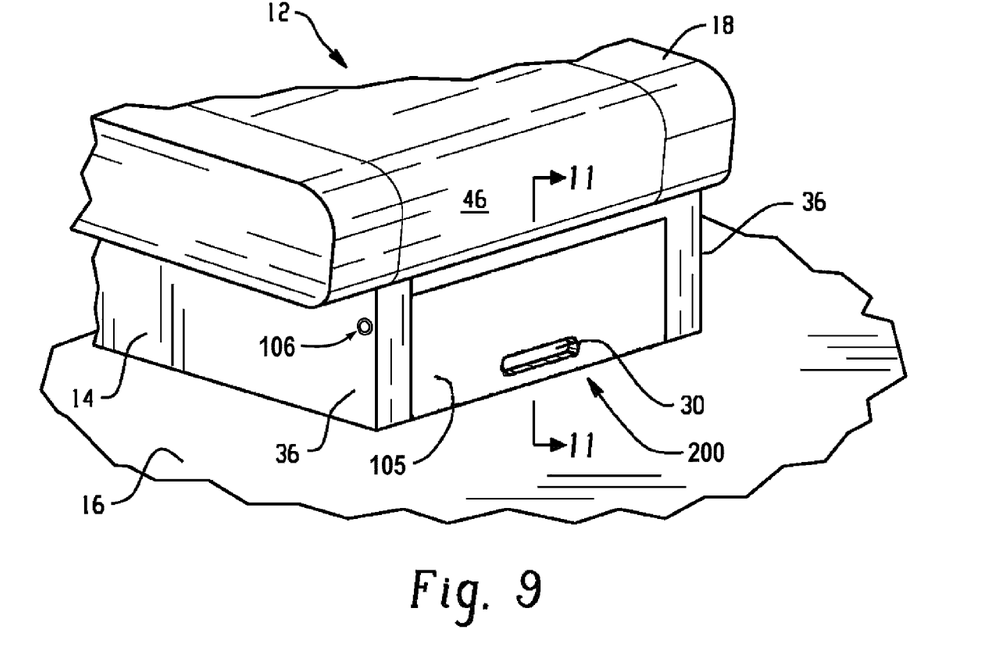
FIG. 9 is a perspective view of a vehicle seat showing the general arrangement of an integral pivotable, retractable step in a stowed position according to another alternate embodiment of the present invention.
Figure 10:
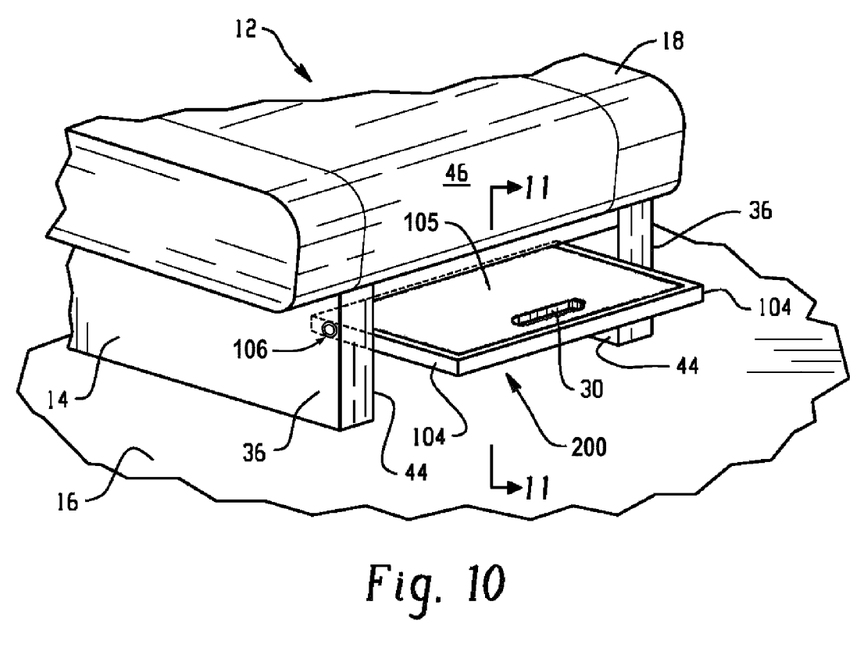
FIG. 10 is a perspective view of a vehicle seat showing the general arrangement of the pivotable, retractable step of FIG. 9 in a deployed position according to an embodiment of the present invention.
Figure 11:
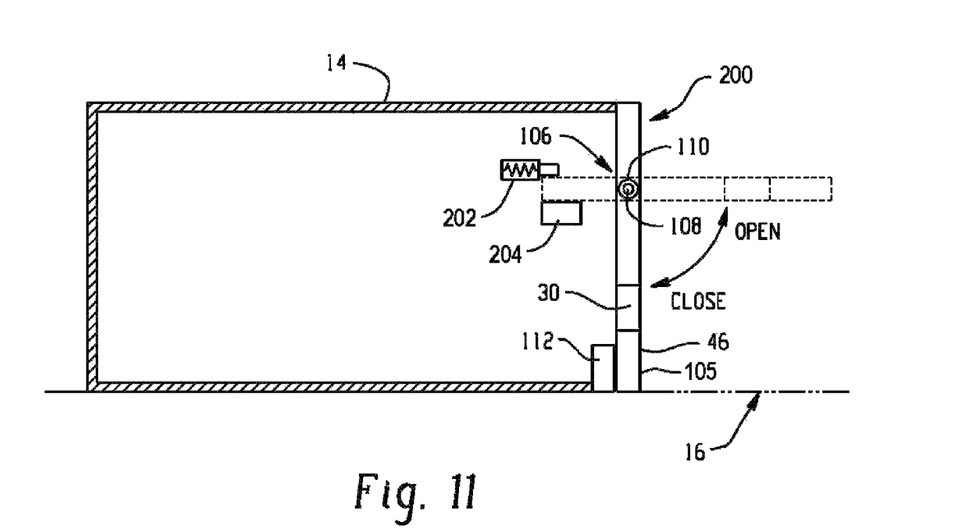
FIG. 11 is a schematic diagram showing details of the configuration of the pivotable, retractable step of FIG. 9 according to another embodiment of the present invention.

In another embodiment of the present invention, shown in FIGS. 9, 10 and 11, a step 200 is normally stowed in a generally vertical orientation when not in use, as shown in solid lines in FIG. 11. A first releasable latch 112 holds step 200 in the stowed position. In this state step 200 generally closes off the front of base 14 as shown in FIG. 9. When step 200 is to be deployed grip 30 is grasped and pulled, overcoming the holding force of first latch 112 and causing the step to pivotably move outwardly from base 14 and upwardly, thereby positioning a front surface 105 of the step for use as shown in broken lines in FIG. 11. A support latch 202 releasably holds step 200 in a generally horizontal deployed condition, preventing downward movement of the step. Support latch 202 may be any conventional type of latch capable of preventing downward movement of step 200 when the step is under load, bearing the weight of an occupant climbing into or out of seat 12. Suitable support latches include, without limitation, electric solenoids and biased mechanical latches. A stop 204 may additionally be positioned proximate step 200 in the deployed condition, thereby retaining the step between support latch 202 and the stop to limit movement of the step when deployed. With reference to FIG. 10, in the deployed condition step 200 is generally proximate a front surface 46 of seat cushion 18 such that the front surface of the seat cushion forms a riser for the step, thereby avoiding a gap forward of seat 12 and between the step and seat that a child could fall through during ingress and egress.

Front surface 105 of step 200 may optionally include a non-skid tread similar to tread 48 of FIG. 7 to help deter the foot of a user from slipping. Alternatively, front surface 105 may optionally include a covering similar to covering 32 of FIG. 9.

Figure 12:
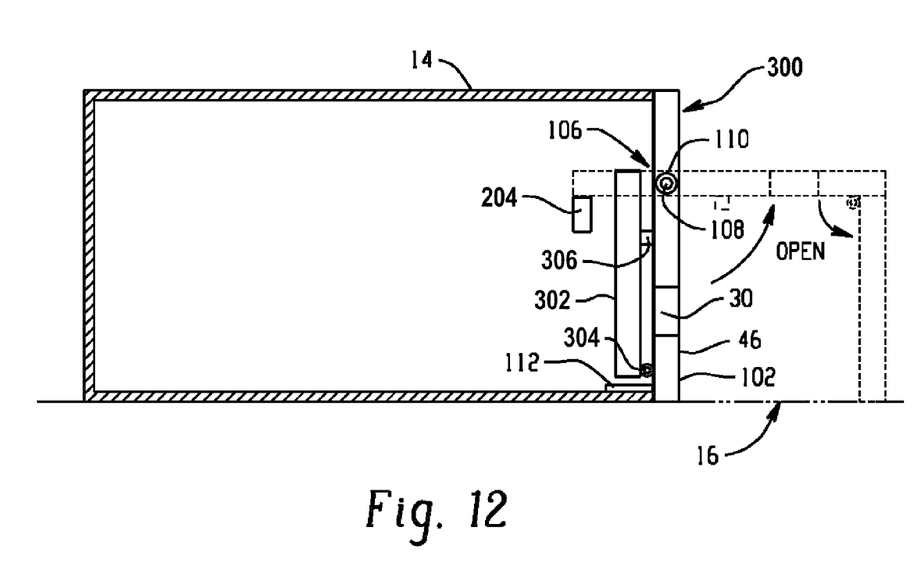
FIG. 12 is a schematic diagram showing details of a configuration of the pivotable, retractable step of FIG. 6 according to yet another embodiment of the present invention.

With reference to FIG. 12, in yet another embodiment of the present invention a step 300 may further comprise a support leg 302 that is attached to the step and either manually or automatically telescopes or pivots from a stowed position within base 14 and generally parallel to the step to a deployed position generally perpendicular to the step. In the example embodiment of FIG. 12 support leg 302 is pivotably attached to step 300 with a hinge 304. A releasable latch 306 such as, without limitation, a magnetic latch, hook-and-loop latch and spring-biased latch, may be included between step 300 and support leg 302 to retain the support leg while in the stowed position. Additionally, a stop 204 may be positioned proximate step 300 in the deployed position as shown in FIG. 12 to limit movement of the step.

Although steps 10, 100, 200 and 300 are shown with a bucket seat in the various figures, it is understood that vehicle seat 12 may also be configured as a bench-type seat within the scope of the invention. Accordingly, all references to a vehicle seat herein are to be interpreted as referring to both a bucket-type and a bench-type seat.

While this invention has been shown and described with respect to a detailed embodiment thereof, it will be understood by those skilled in the art that changes in form and detail thereof may be made without departing from the scope of the claims of the invention.

What is claimed is:

1. A vehicle seat, comprising:
    a generally hollow base secured to a floor of a vehicle, the base having a pair of opposing, spaced-apart base side walls, the base side walls each comprising a generally planar, solid panel closing off a side of the base;
    a generally horizontal seat cushion attached atop the base, the seat cushion being fixedly coupled to the base and having a fixed orientation with respect to the floor, the seat cushion closing off a top of the base;
    a front base opening defined by the floor, the seat cushion and the base side walls;
    a generally vertical seatback attached at a lower end to at least one of the floor, the base and the seat cushion; and
    a step comprising a generally planar, solid panel pivotably coupled to the base side walls, the step being selectively positionable between a generally vertical stowed position closing off the front base opening and a generally horizontal deployed position extending at least partially outwardly through the front base opening,
    wherein the step in the deployed position is generally proximate a front surface of the seat cushion such that the front surface of the seat cushion forms a step riser.

2. The vehicle seat of claim 1 wherein the step pivots downwardly when moving from the stowed position to the deployed position, and pivots upwardly when moving from the deployed position to the stowed position.

3. The vehicle seat of claim 2, further comprising a first latch to releasably hold the step in the stowed position and a second latch to releasably hold the step in the deployed position, a planar rear surface of the step confronting a planar edge of the first latch to limit upward travel of the step in the stowed position, the rear surface of the step further confronting a planar edge of the second latch to limit downward travel of the step in the deployed position.

4. The vehicle seat of claim 1 wherein the step pivots upwardly when moving from the stowed position to the deployed position, and pivots downwardly when moving from the deployed position to the stowed position.

5. The vehicle seat of claim 4, further comprising a support latch to releasably hold the step in the deployed position.

6. The vehicle seat of claim 5, further comprising a stop to limit movement of the step when in the deployed position.

7. The vehicle seat of claim 1 wherein the step further comprises a grip.

8. The vehicle seat of claim 1 wherein the step further includes a covering.

9. The vehicle seat of claim 1 wherein the step further comprises a tread.

10. The vehicle seat of claim 1 wherein the step further includes a support leg that is positionable between a stowed position within the base, generally parallel to the step, and a deployed position generally perpendicular to the step.

* * * * *